(12) United States Patent
Doering

(10) Patent No.: US 12,519,414 B2
(45) Date of Patent: Jan. 6, 2026

(54) METHOD AND CONTROL DEVICE FOR CONTROLLING AN ACTIVE SHORT CIRCUIT IN AN ELECTRIC MACHINE WITH PERMANENT MAGNET EXCITATION

(71) Applicant: ZF FRIEDRICHSHAFEN AG, Friedrichshafen (DE)

(72) Inventor: Jan Doering, Passau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 161 days.

(21) Appl. No.: 18/561,329

(22) PCT Filed: May 9, 2022

(86) PCT No.: PCT/EP2022/062404
§ 371 (c)(1),
(2) Date: Nov. 16, 2023

(87) PCT Pub. No.: WO2022/243074
PCT Pub. Date: Nov. 24, 2022

(65) Prior Publication Data
US 2024/0243684 A1  Jul. 18, 2024

(30) Foreign Application Priority Data
May 17, 2021  (DE) .................. 10 2021 204 933.8

(51) Int. Cl.
*H02P 29/024*  (2016.01)
(52) U.S. Cl.
CPC ................. *H02P 29/024* (2013.01)

(58) Field of Classification Search
CPC ........ H02P 29/024; H02P 3/26; H02P 29/662; H02P 3/22
USPC ............................. 318/400.21, 400.01, 700
See application file for complete search history.

(56) References Cited

U.S. PATENT DOCUMENTS

| | | | |
|---|---|---|---|
| 9,496,810 B2 * | 11/2016 | Raichle | B60L 50/16 |
| 10,479,206 B2 * | 11/2019 | Grossmann | H02P 3/22 |
| 10,784,811 B2 * | 9/2020 | Sano | B60K 6/442 |
| 11,177,751 B2 * | 11/2021 | Min | H02P 25/064 |
| 2004/0145328 A1 | 7/2004 | Hauf | |
| 2014/0062362 A1 | 3/2014 | Kawai | |
| 2014/0191700 A1 | 7/2014 | Eberlein et al. | |
| 2017/0313193 A1 | 11/2017 | Grossmann et al. | |

(Continued)

FOREIGN PATENT DOCUMENTS

| | | |
|---|---|---|
| CN | 108667382 A | 10/2018 |
| DE | 10254608 A1 | 7/2004 |
| DE | 102013213045 A1 | 1/2015 |

(Continued)

*Primary Examiner* — David Luo
(74) *Attorney, Agent, or Firm* — LEYDIG, VOIT & MAYER, LTD.

(57) ABSTRACT

A method for controlling an active short circuit in a permanent magnet excited electric machine, the method including checking if an activating of the active short circuit is requested, registering at least one further state parameter of the electric machine, determining, if the active short circuit is requested in the step of checking, if the at least one further state parameter has a critical value, and controlling the activating of the active short circuit as a function of the determining by sending a control signal to a device for short circuiting.

15 Claims, 1 Drawing Sheet

(56) References Cited

U.S. PATENT DOCUMENTS

2017/0353140 A1   12/2017   Baburajan et al.

FOREIGN PATENT DOCUMENTS

| DE | 102014222256 A1 | 5/2016 |
| DE | 102017207886 A1 | 12/2017 |
| EP | 2745394 B1 | 1/2019 |

* cited by examiner

METHOD AND CONTROL DEVICE FOR CONTROLLING AN ACTIVE SHORT CIRCUIT IN AN ELECTRIC MACHINE WITH PERMANENT MAGNET EXCITATION

CROSS REFERENCE TO RELATED APPLICATIONS

This application is a U.S. National Phase application under 35 U.S.C. § 371 of International Application No. PCT/EP2022/062404, filed on May 9, 2022, and claims benefit to German Patent Application No. DE 10 2021 204 933.8, filed on May 17, 2021. The International Application was published in German on Nov. 24, 2022 as WO 2022/243074 A1 under PCT Article 21(2).

FIELD

The present disclosure relates to a method for controlling an active short circuit in a permanent magnet excited electric machine, and to a control unit, which is configured to carry out the method for controlling the active short circuit.

BACKGROUND

Prior art methods for activating an active short circuit in permanent magnet excited electric machines are known.

SUMMARY

In an embodiment, the present disclosure provides a method for controlling an active short circuit in a permanent magnet excited electric machine, the method comprising checking if an activating of the active short circuit is requested, registering at least one further state parameter of the electric machine, determining, if the active short circuit is requested in the step of checking, if the at least one further state parameter has a critical value, and controlling the activating of the active short circuit as a function of the determining by sending a control signal to a device for short circuiting.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
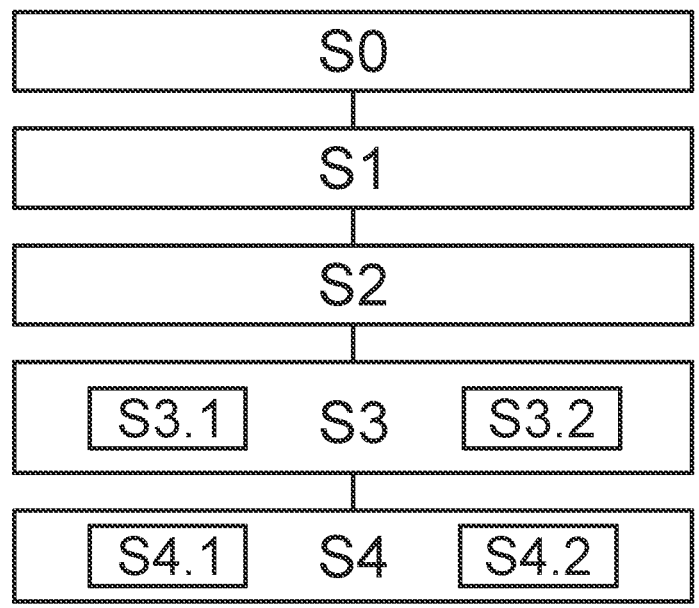
FIG. 1 shows a sequence of method steps for controlling an active short circuit according to an embodiment.

In an embodiment, the invention relates to a method for controlling an active short circuit in a permanent magnet excited electric machine. The method may here be a computer-implemented method, which may be stored in the form of commands on a storage medium and may be executed by a control unit by executing the commands. The permanent magnet excited electric machine may be a generator or an electric motor, wherein at least one of a rotor and a stator of the electric machine may have a permanent magnet. In particular, the electric machine may be a synchronous machine. The controlling of the active short circuit may lead to the electric machine being guided to a safe state in the event of a fault. The controlling here can comprise an active triggering of the active short circuit, as well as also the active triggering at a certain time and/or the suppression of the triggering of the active short circuit. The active short circuit can be carried out via a suitable load, such as a resistor and/or conductor, alternatively or additionally via an inverter, between the terminals of the electric machine.

The method comprises a step of checking if an activation of the active short circuit is requested. An activation of the active short circuit may be requested, for example, by the control unit carrying out the method for controlling the active short circuit. Alternatively or additionally, an activation of the active short circuit may be requested by a further control unit, and this request may be sent by means of a control signal to the control unit carrying out the method. The activation of the active short circuit can be requested, for example, when a safe state of the electric machine is to be achieved.

The method further comprises a step of registering at least one further state parameter of the electric machine. The further state parameter may be at least one of the temperature of the electric machine, in particular the temperature of the permanent magnets and the phase current. The registering may comprise a sensory registering, wherein, for example, a temperature sensor may be mounted in the electric machine, via which the temperature may be registered as a state parameter of the electric machine. Alternatively or additionally, the registering may comprise registering via a data bus, for example, registering a signal from an external control unit, wherein the signal may contain information about the state parameter. In an embodiment of the invention, the step of registering may be performed only if an activation of the active short circuit is requested in the step of checking. Alternatively or additionally, the step of registering may be timed to occur after the step of checking. In an embodiment, if the step of registering is independent of the step of checking, the step of registering may occur at the same time as, before, or after the step of checking.

The method further comprises a step of determining, whether the at least one further state parameter has a critical value if the active short circuit is requested in the step of checking. The critical value may be predeterminable in this regard, in particular the critical value may be time-dependent. For example, the critical value can define a temperature limit of the electric machine, whereby the state parameter can describe the temperature of the electric machine at a certain point in time. Alternatively or additionally, a first temperature limit may be used as the critical value at a first point in time, and a second temperature limit may be used as the critical value at a second point in time. The step of determining can be performed after the step of checking and registering.

Further, the method comprises a step of controlling the activation of the active short circuit depending on the determining by sending a control signal to a device for short-circuiting. For example, controlling the activation may occur if the state parameter has the critical value. Alternatively or additionally, the controlling of the activation may be carried out differently in case of a positive step of the determining, i.e. that the state parameter has the critical value, than in case of a negative step of the determining. Thus it can be controlled, for example, that in the positive step of the determining, the active short circuit is not activated, and in the negative step of the determining, the active short circuit is activated. The active short circuit can be activated immediately, i.e. at the next possible point in time, or with a time delay. The device for short circuiting can thereby be part of the electric machine, in particular a further feature of the electric machine, and/or an external device, such as an inverter. Thereby, the device can be configured to short circuit the terminals of the electric machine in order to achieve a safe state of the electric machine. In this case, the step of controlling can take place after the step of determining.

Advantageously, a method is thus shown, with which the safe state can be achieved when the active short circuit is requested in the permanent magnet excited electric machine depending on a further state parameter of the electric machine. Thus, the sole request of the active short circuit does not necessarily lead to the immediate activation of the active short circuit, rather the activation of the active short circuit is also controlled via a further state parameter of the electric machine. Thus, a more differentiated controlling of the activation of the active short circuit via the method is shown.

According to an embodiment, in the step of checking it may be requested that an activation of the active short circuit is carried out if a back EMF of the electric machine exceeds a threshold voltage, whereby the step of determining may occur if the back EMF exceeds the threshold voltage. The back EMF may be the voltage induced at the open motor terminals, whereby the induced voltage at the terminals is not tapped by a load and can thus build up. The threshold voltage can describe the value of the terminal voltage, at which activation of the active short circuit can be requested. This threshold voltage may, for example, be stored in a storage medium of a control unit executing the method and read out for comparison with the back EMF. Alternatively or additionally, the threshold voltage can be stored on the hardware side, for example, in the device, which is controlled to activate the active short circuit, for example, by suitable dimensioning of the device, such as the inverter. If a first threshold voltage is predefined on the software side in a storage medium, and a second threshold voltage is predefined on the hardware side, the first threshold voltage can be smaller than the second threshold voltage. In the event that the control unit executing the method has a fault and/or is no longer active, this may result in the active short circuit being activated even if the first threshold voltage is exceeded by the back EMF when the second threshold voltage is exceeded by the back EMF. The step of checking may, alternatively or additionally, comprise a value registering of the induced voltage at the open terminals of the electric machine. In particular, the step of checking may only comprise the registering of the open terminal voltage without comparing it to the threshold voltage in this step of the process.

Advantageously, a safe state of the electric machine can thus be achieved in the case of back EMF fault, whereby the achievement of the safe state is dependent on at least one further state parameter of the electric machine. In particular, this can be advantageous in the case of an exceedingly high voltage at open terminals of the electric machine, i.e. in the case of back EMF.

According to an embodiment, the method may further comprise a step of calculating an expected transient current depending on the induced voltage and depending on the at least one further state parameter. In this regard, the step of determining whether the state parameter has a critical value may be performed depending on the expected transient current. The step of calculating can further be done by using a look-up table with entries, for example, on the induced voltage at the terminals, the state parameter and the transient current to be expected therefrom. Alternatively, at discrete time intervals, the expected transient current can be calculated directly from the induced voltage and the further state parameter. This may be the case in the step of determining whether the state parameter has a critical value, for example, if the expected transient current exceeds a critical threshold current. In this case, the threshold current is defined as a current value, above which permanent damage is to be expected during through-flow to at least one component of a device involved in the method, such as the electric machine or the inverter. The threshold current may be a predeterminable threshold current, in particular, depending on the electric machine, in particular, the components of the electric machine, and, alternatively or additionally, depending on the inverter. Alternatively or additionally, the threshold current may be predetermined depending on devices and/or components of devices connected to the electric machine, such as the inverter. The step of calculating the expected transient current may be performed after checking and registering. The step of calculating can further be performed only if the induced voltage exceeds the threshold voltage. Thus, in the other cases, resources can be saved with respect to the calculating. Alternatively, the step of calculating can be performed independently of the exceeding of the threshold voltage by the terminal voltage. Furthermore, the calculating step can be performed before the step of controlling.

Advantageously, the transient current to be observed during an active short circuit when the terminals are short circuited can thus be used to control the activation of the short circuit. This can be advantageous because a possible demagnetization of the permanent magnet of the electric machine correlates with the level of the expected transient current, which itself generates a counter magnetic field. Further, the level of the transient current may be detrimental to devices connected to the electric machine, such as the inverter. For example, if the expected transient current would not result in demagnetization of the permanent magnet, and alternatively or additionally, would result in damage to other devices, such as the inverter, the activation may be controlled to occur promptly. Alternatively or additionally, it can be controlled that, if the expected transient current would demagnetize the permanent magnets of the electric machine, and, alternatively or additionally, damage to further devices, such as the inverter would be expected, the short circuit should not be activated promptly, rather should be postponed.

According to an embodiment, the one further state parameter can describe a rotor position relative to the stator. The position can be specified in 1 degree steps, for example, and can be registered in the registration step.

Advantageously, the activation of the active short circuit can thus be controlled depending on the rotor position. For example, the appropriate critical value can describe one or more critical rotor positions relative to the stator, in particular critical positions, at which high transient currents can be expected in the windings of the electric machine. Thus, in such situations where high transient currents can be expected, the activation of the active short circuit can be controlled to delay the activation. Accordingly, non-critical rotor positions, i.e. positions where a comparatively low transient current will occur, can be used for activating the active short circuit.

According to an embodiment, in the step of determining whether the at least one further state parameter has a critical value, a point in time for the activation of the active short circuit can be determined and the activation of the active short circuit can be controlled at this determined point in time. In particular, the point in time can be determined depending on the further state parameter, such as the rotor position relative to the stator, and alternatively or additionally, depending on the request for the activation of the active short circuit, for example, depending on the back EMF of the electric machine. In particular, in an embodiment, the point in time may be determined depending on the calculated and expected transient current. In such an embodiment, the determining of the point in time may be performed after the calculation of the transient current. In an embodiment, the step of determining the point in time may occur before, simultaneously with, or after the step of calculating the transient current. The controlling of the activation at the determined point in time may mean controlling the activation so that the short circuit occurs at the determined point in time. Alternatively, the control signal may be sent to the device for short circuiting at the particular point in time.

Advantageously, a planning reliability can thus be provided with regard to the activation of the active short circuit by determining the point in time for the activation of the active short circuit. By communicating an information signal comprising the point in time to further devices connected to the electric machine, these can initiate reactions depending on the point in time. For example, devices electrically connected directly to the electric machine can control electrical connections to the electric machine depending on the point in time. Thus, these devices can be electrically disconnected from the electric machine at the time of the activation of the active short circuit, or shortly before, in order not to suffer damage due to excessively high voltage and/or excessively high current.

According to an embodiment, the registering of the at least one further state parameter may be performed at at least two different points in time. In other words, one state parameter value may be registered at each of the two different points in time. Alternatively or additionally, determining the point in time for activating the active short circuit may be performed depending on the state parameters at the at least two points in time. Furthermore, checking whether an activation of the active short circuit is requested may be performed at at least two different points in time. The registering and/or the checking may be performed at regular time intervals, for example, periodically. Thus, the determining can take place depending on periodically registered state parameters and/or request for activation of the active short circuit.

Advantageously, the determining of the point in time for the activation of the active short circuit can thus take place depending on a changing state parameter and/or on the changing request of the activation of the active short circuit over the time. Thus, the determining of the point in time may be performed depending on a dynamic quantity, namely at least depending on the state parameter values. Thus, the determining of the point in time for controlling the activation of the active short circuit can be performed on the basis of a history of state parameter values. Thereby, by means of the method, it can be better estimated, at which point in time the activation of the active short circuit should be controlled based on this history in order to prevent damage due to excessively high voltage or an excessively high current.

According to an embodiment, the expected transient current can be calculated for the at least two different points in time. Furthermore, the active short circuit can be activated if the expected transient current falls below the threshold current in a time period between the two points in time. In other words, at a first point in time, the transient current may be calculated, this current being larger than the threshold current at the first point in time, and at a later, second point in time, the transient current may be calculated, this current being smaller than the threshold current. Next, according to the embodiment, the activation of the active short circuit may be controlled such that the active short circuit is activated after the second point in time. This may be based on the fact that in a period between the first and the second point in time, the expected transient current falls below the threshold current, and consequently no or less damage is to be expected due to the lower current at the permanent magnet.

Advantageously, the method can thus be used to determine the controlling of the active short circuit such that the short circuit is to be activated only when the expected transient current does not exceed, in particular no longer exceeds, the threshold current. In this way, damaging magnetic fields, which would emanate from the transient current to be expected in the event of a short circuit, can be avoided. Thus, a permanent demagnetization of the permanent magnet of the electric machine can be avoided.

According to an embodiment, a time history of the transient current to be expected can be calculated depending on the threshold voltage and the at least one further state parameter. Alternatively, a time history of the transient current to be expected can be calculated depending only on the at least one further state parameter and, alternatively or additionally, depending on the request for activation of the active short circuit. This time history can be derived from a short circuit model. The short circuit model may allow determining output variables, such as the current or the magnetic field, depending on input parameters, for example the threshold voltage, the one or more state parameters or the terminal voltage. In particular, the time history for a period in the future can be determined or approximated based on present data and historical data, especially on the terminal voltage and the at least one state parameter.

Advantageously, the transient current in the event of a short circuit can thus be predicted in the time history depending on values to be registered, checked or determined, such as the back EMF or the condition parameters. Thereupon, it can be derived from the time history when it may be favorable to activate the short circuit. In particular, this can be advantageous if the expected transient current in the time history is not maximum.

According to an embodiment, a local minimum of the time curve of the current can be determined as the point in time of activation of the active short circuit. A local minimum of the time curve of the current can also represent a global minimum of this curve. Advantageously, the active short circuit can thus be activated when the expected transient current, and thus also the expected counter-magnetic field, is minimized. Thus, damage to the permanent magnet, and thus to the electric machine, and, alternatively or additionally, to the inverter can be avoided or at least minimized.

According to an embodiment, the method may further comprise a step of predetermining the threshold current depending on components of the electric machine or depending on devices electrically connected to the electric machine. In this regard, the active short circuit may be activated if the expected transient current is below the threshold current. For example, an inverter may be connected to the electric machine. Depending on the inverter, the threshold current can be specified, in particular predetermined. For example, in the case of a favorable inverter, the threshold current can be predetermined low, in particular predetermined so that, when the active short circuit is activated via the inverter, transient currents through the electric machine and thus through the inverter, which is connected to the electric machine, in particular to the terminals of the electric machine, do not exceed the low predetermined threshold current. Thus, the inverter can be protected against excessive transient currents. In an embodiment, the threshold current can be predetermined comparatively high, especially if a connected device, for example an inverter, is relatively expensive. Thus, the threshold current can be set high so that relatively high transient currents can flow through the electric machine, and thus through the inverter, for example. The setting of the threshold current can be done, for example, by sending information from the component or device to the electric machine. For example, a device identifier can be sent to the electric machine. Based on the identifier, the cost of a defect in the component or device can then be inferred, for example based on a stored table. Alternatively or additionally, the threshold current can be predetermined via a user input.

Thus, advantageously, a sacrifice of certain devices and/or components of the electric machine and/or further devices can be forced via the predeterminable threshold current, depending above all on the economic efficiency. For example, the cheaper device can be sacrificed to protect the more expensive device or the more expensive electric machine.

According to an embodiment, an electrically connected device may be a contactor, and the threshold current may be predetermined depending on parameters of the contactor. In particular, the contactor may be located between the inverter and the electric machine and, in an open state, may protect the inverter and other devices located downstream of the inverter from high terminal voltages at the electric machine. In particular, in an embodiment, the contactor may be inexpensive. Thus, in such an embodiment, the contactor can be sacrificed by predetermining a relatively low threshold current so that first the contactor suffers permanent damage due to the transient current before an active short circuit is activated at an even more inconvenient time and thus the permanent magnets of the electric machine could be permanently damaged.

According to an embodiment, a threshold current can be predetermined, which is below a transient current that can destroy the components of the electric machine or the devices connected to the electric machine. Thus, a buffer can be introduced so that even if the threshold current predetermined here is exceeded, there is still no permanent damage to the electric machine or the devices connected to the electric machine due to the transient currents being too high. The relative and/or absolute level of the buffer, expressed, for example, in amperes, can be made depending on parameters of the electric machine and/or the devices.

According to an embodiment, the method may further comprise a step of regulating a temperature of the magnets of the permanent magnet excited electric machine. In particular, this step of regulating the temperature of the magnets may be performed after the step of determining whether the at least one further state parameter has a critical value and before the step of controlling the activation of the active short circuit, in particular before the actual activation of the short circuit. Regulating the temperature of the magnets may in particular comprise cooling the magnets. The cooling may be performed, for example, using liquids and/or gases. In particular, a phase transition may be used to effectively cool the magnets. For example, a liquid can be applied to the magnets, which is heated by the magnets and can absorb heat from the magnets when they are warm relative to the liquid such that this liquid evaporates and can effectively absorb heat energy from the magnets via a phase transition, that is, a lot of heat energy in a short time interval. In particular, by reducing the temperature of the magnets, the magnetization of the permanent magnets of the electric machine can be increased. Thus, an expected transient current during an active short circuit and associated magnetic field can be counteracted by increasing the magnetization of the permanent magnets and thus counteracting the permanent damage. A regulating may also have an adjustment to a higher value of the temperature, in particular by heating the magnets, for example by means of a heating wire. Thereby the magnetization of the magnets can be reduced, which reduces the induced voltage and thus reduces the terminal voltage at the electric machine. Thereby, the expected transient current can be reduced. Alternatively or additionally, the controlling of the activation of the active short circuit can be influenced by this.

According to an embodiment, the method may further comprise a step of controlling a mechanical brake. The step of controlling the mechanical brake may be timed to occur after the step of determining whether the at least one further state parameter has a critical value and before the step of controlling the activation of the active short circuit. The mechanical brake can be used to reduce the rotational speed of the electric machine. Thereby the induced voltage can be reduced. Advantageously, the active short circuit can thus also be postponed in time, in particular also completely avoided, in particular because, by reducing the rotational speed at the electric machine, the terminal voltage cannot exceed the threshold voltage. At least the expected transient current can be reduced by reducing the terminal voltage.

An aspect relates to a control unit that is configured to carry out the method according to an embodiment of the preceding aspect for controlling the activation of the active short circuit. The control unit may be, for example, a control unit of a vehicle and may be connected to other control devices of the vehicle via a vehicle bus. Thus, the control unit may, for example, register the at least one state parameter via the vehicle bus. Further, the control unit may register the terminal voltage via the vehicle bus and determine, depending on the terminal voltage and the state parameter, in case the induced voltage exceeds the threshold voltage, whether the at least one further state parameter has a critical value. Furthermore, the control unit may be configured to control the activation of the active short circuit depending on the determining. For this purpose, the control unit may be configured to send a control signal, in particular via the vehicle bus, to a further control unit for short circuiting. The further control unit can control a device for short circuiting the terminals of the electric machine.

DETAILED DESCRIPTION OF EMBODIMENTS

Figure 2:
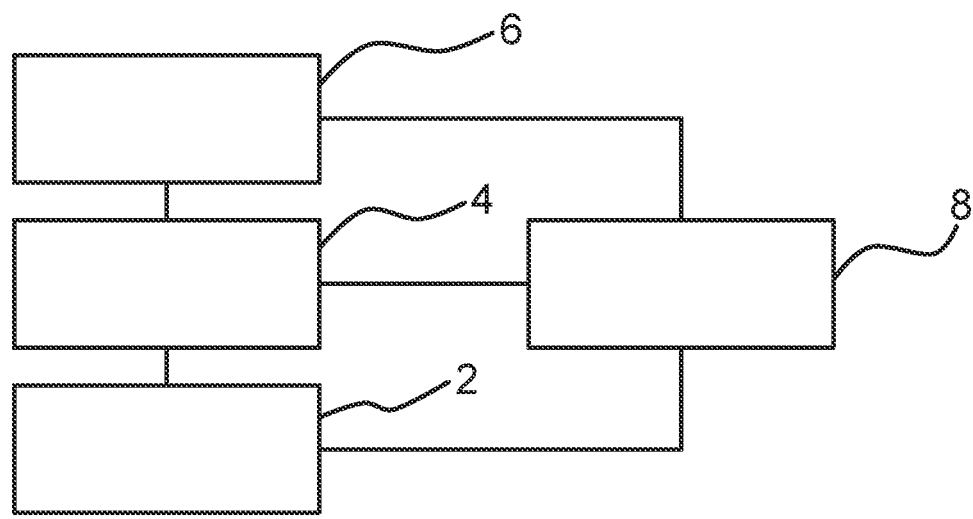
FIG. 2 shows a control unit for carrying out a method according to an embodiment.

FIG. 1 shows a sequence of method steps for controlling an active short circuit according to an embodiment. The method has a chronological first step S0 of predetermining a threshold current. The step of predetermining the threshold current is performed by a control unit 8, which is shown in FIG. 2. In the embodiment shown, a contactor 4 is connected to the control unit 8. The contactor 4 sends a signal to the control unit 8, whereby the control unit 8 determines the threshold current depending on the information of the signal. In this embodiment, the contactor 4 is set up as a device to be sacrificed, that is, the threshold current is predetermined by the control unit 8 such that, at the latest when the threshold current is reached, the contactor 4 will have a permanent defect due to the excessively high transient current. Further, an inverter 6 is connected to an electric machine 2 via the contactor 4. The contactor 4 is thereby connected to the electric machine 2, in particular it is connected to the electric machine 2 via terminals of the electric machine 2. The electric machine 2 has permanent magnets. In particular, during the step S0 of predetermining the threshold current depending on parameters of the contactor 4, the threshold current is predetermined such that, of the devices electric machine 2, contactor 4 and inverter 6, the contactor 4 would be sacrificed if an excessively high transient current is to be expected through the components electric machine 2, contactor 4 and inverter 6.

The control unit 8 is further adapted to perform a step S1 of checking whether an activation of the active short circuit is requested. The activation of the active short circuit is requested if a back EMF of the electric machine (2) exceeds a threshold voltage. The back EMF is the induced terminal voltage with open motor terminals of the electric machine 2. For checking, the control unit 8 registers the terminal voltage at terminals of the electric machine 2 via a data bus to which the control unit 8 is connected. A measuring device is also connected to the data bus and measures the terminal voltage.

Furthermore, the method comprises a step S2 of registering a state parameter of the electric machine 2. According to the embodiment, the state parameter comprises a rotor position of a rotor in comparison to the stator of the electric machine 2. This relative rotor position is registered via a sensor, in particular a sensor of the electric machine 2, and is sent to the control unit 8 via the data bus.

Furthermore, the method comprises a step S3 of determining whether the state parameter has a critical value. The critical value in the embodiment shown is a range of critical relative rotor positions with respect to the stator of the electric machine 2. For this purpose, an expected transient current is calculated in a step S3.1 depending on the rotor position. Further, the method comprises a step S3.2 of determining a point in time for activating the active short circuit. In particular, the control unit 8 is disposed to determine, depending on the calculated expected transient current and the threshold current determined in step S0, the point in time for activation, at which a magnetic field caused by the current is smaller than a magnetic field damaging the permanent magnet of the electric machine 2. In the case where the expected transient current exceeds the threshold current, the point in time for activation of the active short circuit is postponed, and in the case where the expected transient current does not exceed the threshold current, a point in time for activation of the active short circuit is determined promptly.

Furthermore, the method comprises a step S4 of controlling the activation of the active short circuit. For this purpose, the control unit 8 sends a control signal via the vehicle bus to a device for activating the active short circuit between the terminals of the electric machine 2. Part of the control signal is the short circuit command and the point in time, which has been determined and at which the active short circuit is to be activated. Furthermore, the method comprises a step S4.1 of regulating a temperature of the magnets of the electric machine 2. The step S4.1 is carried out chronologically with the step S4, in this case specifically before the actual activation of the short circuit. Thus, in step S4.1, the control unit 8 can send a control signal to a device to cool the magnets of the electric machine 2 in order to increase the magnetization of the permanent magnets so that, when the short circuit is activated, in particular when the short circuit is activated chronologically directly after the temperature of the magnets is regulated, this can be done in such a way that the magnetization is at a maximum. Thus, demagnetization is avoided. Furthermore, the method comprises a step S4.2 of controlling a mechanical brake. The mechanical brake is mechanically connected directly to the electric machine 2 and brakes the relative movement of the rotor to the stator of the electric machine 2 when controlled by the control unit 8. The step S4.2 occurs simultaneously with the step S4 and the step S4.1. Thus, the control unit 8 controls the brake to decelerate the relative movement of the rotor while simultaneously the magnets are being cooled. This initially reduces the induced voltage at the terminals of the electric machine 2 due to the braking effect. The active short circuit is then activated after the magnets have been cooled, which increases the magnetization of the permanent magnets and protects them from demagnetization.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 2 electric machine
4 contactor
6 inverter
8 control unit
S0 (step) predetermining the threshold current
S1 (step) checking whether an activating of the active short circuit is requested
S2 (step) registering a state parameter of the electric machine
S3 (step) determining if a state parameter has critical value
S3.1 (step) calculating an expected transient current S3.2 (step) determining a point in time for activating the active short circuit S4 (step) controlling the activating of the active short circuit S4.1 (step) regulating a temperature of the magnets of the electric machine S4.2 (step) controlling a mechanical brake

The invention claimed is:

1. A method for controlling an active short circuit in a permanent magnet excited electric machine, the method comprising:
   checking if an activating of the active short circuit is requested;
   registering at least one further state parameter of the electric machine;
   determining, if the active short circuit is requested in the step of checking, if the at least one further state parameter has a critical value; and
   controlling the activating of the active short circuit as a function of the determining by sending a control signal to a device for short circuiting.

2. The method according to claim 1, wherein in the step of checking the activation of the active short circuit is requested if a back EMF of the electric machine exceeds a threshold voltage, and wherein the step of determining occurs if the back EMF exceeds the threshold voltage.

3. The method according to claim 1, further comprising calculating an expected transient current depending on the induced voltage and depending on the at least one further state parameter, and wherein the step of determining whether the state parameter has a critical value is performed depending on the expected transient current.

4. The method according to claim 3, wherein a time history of the expected transient current is calculated depending on the threshold voltage and the at least one further state parameter.

5. The method according to claim 4, wherein a local minimum of a time curve of the expected transient current is determined as the point in time for activating the active short circuit.

6. The method according to claim 3, further comprising predetermining a threshold current depending on components of the electric machine or depending on devices electrically connected to the electric machine.

7. The method according to claim 6, wherein the electrically connected devices include a contactor, and the threshold current is predetermined depending on parameters of the contactor.

8. The method according to claim 6, wherein the threshold current is below a transient current that destroys the components of the electric machine or the devices electrically connected to the electric machine.

9. The method according to claim 1, wherein the one further state parameter describes a rotor position relative to a stator.

10. The method according to claim 1, wherein in the step of determining whether the at least one further state parameter has a critical value, a point in time for activation of the active short circuit is determined and the activating of the active short circuit is controlled at the determined point in time.

11. The method according to claim 10, wherein the registering of the at least one further state parameter takes place at at least two different points in time and the determining of the point in time for activating the active short circuit takes place depending on the state parameter values at the at least two points in time.

12. The method according to claim 11, wherein the expected transient current is calculated for the at least two different points in time and the active short circuit is activated if the expected transient current falls below a threshold current in a period between the two points in time.

13. The method according to claim 1, wherein the method further comprises regulating a temperature of magnets of the permanent magnet excited electric machine.

14. The method according to claim 1, wherein the method further comprises controlling a mechanical brake.

15. A controller configured to carry out the method according to claim 1 for controlling the activation of the active short circuit.

* * * * *